March 30, 1937.   E. K. VON MERTENS   2,075,411
FASTENER STUD
Filed July 21, 1934
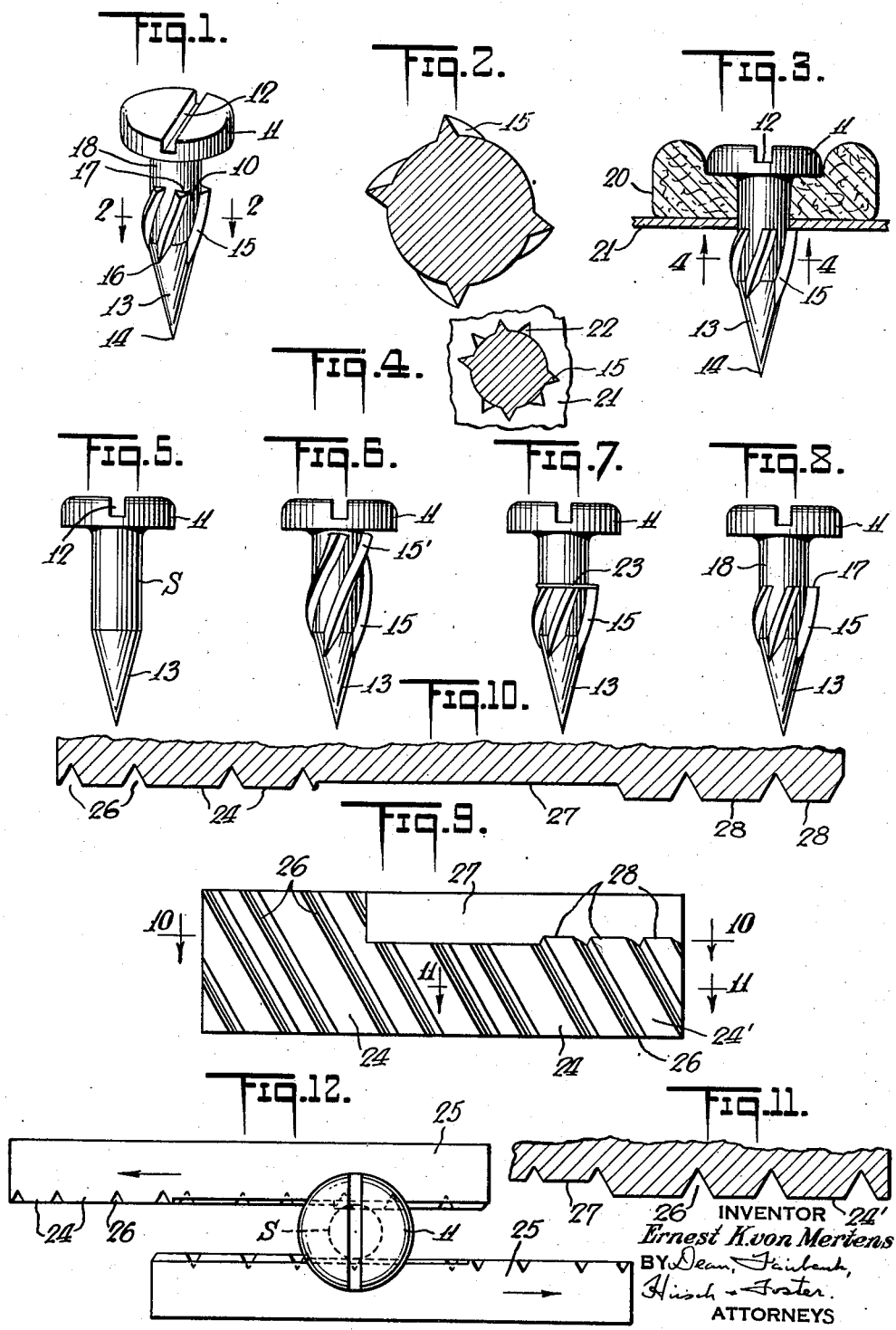
INVENTOR
Ernest K. von Mertens
BY
ATTORNEYS Patented Mar. 30, 1937

2,075,411

UNITED STATES PATENT OFFICE 2,075,411

FASTENER STUD

Ernest K. von Mertens, New York, N. Y., assignor to Groov-Pin Corporation, Long Island City, N. Y., a corporation of New York Application July 21, 1934, Serial No. 736,326

6 Claims. (Cl. 85—44)

My present invention relates to fastener studs and while by no means limited to such use, has specialized utility as a so-called lace fastener for automobile bodies.

An object of the invention is to provide a fastener of the above type which, while of simple construction easily produced and easy to apply, is substantially perfect in its effectiveness to keep the lace or binding securely in place, substantially regardless of how severe the vibration or other loosening impulse may be during use of the vehicle.

Another object is to provide a stud of the above type which can be applied with the use of conventional tools, including a hammer or mallet and a screw driver, and which affords a fastener quite as effective as a rivet.

Another object is to provide an expeditious method of producing the stud and simple apparatus for carrying out said method, by a simple rolling action in which are performed a sequence of steps resulting in the specialized stud of this invention.

In the accompanying drawing, in which is shown one of various possible embodiments of the several features of the invention, Fig. 1 is a perspective view of a preferred form of lace fastener stud, Fig. 2 is a cross-sectional view on a larger scale taken on the line 2—2 of Fig. 1, Fig. 3 is a transverse sectional view showing the stud applied in use, Fig. 4 is a sectional view on line 4—4 of Fig. 5, Fig. 5 is a side elevational view showing the original stud stock from which my specialized fastener stud is produced, Fig. 6 is a similar view showing the stock after the first rolling step, Fig. 7 is a similar view showing the stock after the second rolling step, Fig. 8 is a similar view showing the completed stud, Fig. 9 is a plan view of a preferred rolling plate employed in producing the stud, Fig. 10 is a sectional view taken on line 10—10 of Fig. 9, and on a larger scale, Fig. 11 is a sectional view taken on line 11—11 of Fig. 9, on a larger scale, and Fig. 12 is a top plan view illustrating the rolling operation.

Referring now to the drawing, the preferred form of stud as shown in the perspective view of Fig. 1 and as also shown in use in Fig. 3, preferably made of machine steel stock, comprises a generally cylindrical shank 10 having a head 11 with a fillister slot 12 at one end and tapered at 13 to a point 14 at the other end. Threads or ribs 15 triangular in cross-section protrude from the shank, merging at their lower ends at 16 with the upper end of the tapered point 13 at their lower ends below the upper end of the tapered point and terminating sharply at their upper ends 17, in a common plane, spaced from and parallel to the head 11, leaving a substantial cylindrical portion near the upper end of the shank unthreaded, as at 18. Preferably, as appears best in Fig. 2, the threads, while of uniform pitch, are spaced at non-uniform intervals peripherally of the shank, for a purpose which will appear presently.

In Fig. 3 is shown in cross-sectional view, a specialized application of the stud as a lace fastener for automobiles. It is used to attach the thick lace or binding 20 ordinarily used as a rattle-preventing support for the hood, the windows and other parts of an automobile with respect to the contiguous metal body plate 21. For such application, the stud is driven by a hammer or mallet, so that its sharp point 14 penetrates the lace 20 and the sheet metal plate 21. Thereafter, the stud is driven further by a screw driver applied to the fillister slot 12 in which operation, the triangular threads or ribs 15 will cut corresponding notches 22 into the metal plate 21 and immediately after the blunt extremities 17 of said threads or ribs have passed the lower or concealed face of the plate 21, the further turning of the fillister head will bring the blunt upper ends of the threads out of registry with the notches 22 they have cut, but the ends of said threads or ribs will remain in firm engagement with the under face of the metal plate 21, all as shown in Fig. 4.

Thus, the lace will be effectively compressed between the head 11 of the stud and the plate 21, the thickness of the lace or binding 20 being compacted exactly to the height afforded by the unthreaded portion 18 of the shank which extends above plate 21.

By the preferred arrangement described, whereby the threads 15 while of equal pitch are spaced at non-uniform intervals, it is clear that the keying connection of said stud with respect to the plate 21 is unlikely to become released, since even if under exceptional conditions, there should be some turning of the stud after it has been applied, such turning would not result in loosening of the lace, because the probability that the unequally spaced threads will enter into the one unique position of exact registry with the corresponding notches 22 is so small as to be negligible. Where the threads are equally spaced, on the other hand, it is clear that such registry is much more likely to occur.

In Figs. 5 to 12, is illustrated a preferred method of, and apparatus for producing the stud shown in Figs. 1 to 3, and previously described. Referring first to Figs. 5 to 8, there is shown in Fig. 5, the stock from which the stud of Fig. 1 is produced. This stock comprises a smooth cylindrical shank S with a tapered point 13 and a head 11 with a fillister slot 12. According to the invention, the thread is preferably rolled on said stud. For this purpose, as shown in Fig. 6, the first operation consists in rolling such thread 15 from the wider end of the tapered point substantially up to the fillister head 11.

As shown in Fig. 7, the next step consists in flattening out the upper portions of the rolled threads of Fig. 6 by forcing or rolling the same back into the cylindrical stock, in which operation, however, a web 23 is thrown up, which bridges the gaps between the upper blunt extremities of the remaining thread segments 15.

The next and final step resulting in the final stud product of Fig. 8, consists in another rolling operation in the immediate vicinity of the web 23, which is thereby rolled into and flush with the cylindrical shank of the stud.

The succession of rolling steps above set forth and illustrated in Figs. 5 to 8, may be performed by any of a variety of apparatus, but it is preferably accomplished by the rolling plate apparatus shown in Figs. 9 to 12.

As best shown in Figs. 9, 10 and 11, each of the plates 25, is of steel and has parallel teeth 24 extending obliquely across the plate, and separated by oblique grooves 26 therebetween, which, of course, correspond in cross-section to the triangular cross-section of the threads to be rolled. The teeth 24 are non-uniform in width, as shown, to attain the corresponding non-uniform spacing of the threads described, and best shown in Fig. 2.

In the rolling operation, the plates are preferably maintained vertical, as shown in Fig. 12, while the head 11 of the stock shown in Fig. 5 rests upon their upper edges, the two plates 25 in operation being driven in opposite direction with the exertion of pressure against the shanks S therebetween.

As shown in Figs. 9, 10 and 11, each of the plates has a flat rectangular area 27, without grooves, and depressed slightly, say about halfway the depth of grooves 26, and extending along the upper edge of the plate, from the right ends thereof. This area is of width equal to the length of the unthreaded shank portion 18 of the stud and is of length at least twice the circumferential length of the stud. The grooves 26 only reach the rim of the rectangular area 27, but those of the teeth 24' that reach the lower edge of the right or outer half of said area extend slightly beyond said edge, as shown at 28, and are of height slightly greater than the remaining teeth, as appears clearly in the drawing.

It will be immediately apparent that in the rolling operation, the threads 26 at the left end of the plate are effective to roll the entire length of thread, as shown in Fig. 6. As the rolling proceeds, the flat area 27 then becomes effective to press the upper portions 15' of the threads formed at the beginning of the rolling operation into the cylindrical stock, to produce the intermediate product shown in Fig. 7, with its web 23 and finally as the right end of the plate apprachees the shank, teeth 24' slightly reduce the diameter of the corresponding part of the stud, while the upper ends 28 of said teeth, force the metal of web 23 into the cylindrical stock to produce the final product shown in Fig. 8.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent of the United States is:—

1. A fastener stud having a head with a fillister slot and a tapered point and including a shank having ribs protruding therefrom limited to a portion thereof materially shorter than the length of said shank and spaced both from the point and from the head but extending to below the upper end of the tapered point the lengths of rib along the shank being uniform in cross section and the lengths thereof along the tapered point, tapering in width and height to afford entering points.

2. A fastener stud having a tapered point, a generally cylindrical shank and a head, said shank having steep threads integral therewith extending from below the upper end of said tapered point and terminating sharply at a substantial distance from the head the lengths of thread along the shank being uniform in cross section and the lengths thereof along the tapered point, tapering in width and height to afford entering points.

3. A fastener stud having a shank, a head with a fillister slot and a plurality of threads integral with said shank, with their upper ends terminating sharply in a plane parallel to and at a substantial distance from said head, said threads having uniform pitch but spaced from each other at non-uniform intervals.

4. A threaded fastener stud comprising a metal shank having a tapered point at one end and a fillister head at the other end, said stud having four threads unitary with the shank thereof, triangular in cross-section, of uniform pitch but at non-uniform intervals, each of said threads merging at its lower end into the upper end of the tapered point and terminating abruptly at its upper end, said terminations of said threads being in a common plane parallel to but spaced from the fillister head.

5. A lace fastener stud of the type for use on automobile bodies and particularly for securing a thick lace to a sheet metal body portion, said fastener comprising a generally cylindrical stud having a tapered point and a fillister head, said fastener stud having ribs protruding from the shank, commencing from below the upper end of the tapered point and terminating sharply in a plane parallel to said head but spaced therefrom by a distance corresponding to the combined thickness of the compressed lace and the sheet metal body, the lengths of ribs along the shank being uniform in cross section and the lengths thereof along the tapered point, tapering to afford entering points whereby in use the stud is driven through the lace and sheet metal fastener by a hammer blow so that the ribs will force corresponding notches into the sheet metal and may thereupon be brought home by a turning operation at the fillister head so that their abrupt ends will pass out of registration with said notches and pass under the sheet metal body portion.

6. A lace fastener stud of the type for use on automobile bodies and particularly for securing a thick lace to a sheet metal body portion, said fastener comprising a generally cylindrical stud having a conical point and a fillister head, said fastener stud having ribs protruding from the shank, of uniform height and width, and presenting smooth cutting edges, terminating at their upper ends in a plane parallel to said head but spaced therefrom by a distance corresponding to the combined thickness of the compressed lace and the sheet metal body, the length of shank between said head and said threads being relatively smooth, said ribs at their lower ends tapering in height to merge with said conical point near the blunt end of the latter, whereby in use the stud is driven through the lace and sheet metal fastener by a hammer blow so that the ribs will force corresponding notches into the sheet metal and may thereupon be brought home by a turning operation at the fillister head so that their upper ends will pass out of registration with said notches and pass under the sheet metal body portion.

ERNEST K. von MERTENS.